(12) United States Patent  (10) Patent No.: US 8,866,819 B2
Dunko et al.  (45) Date of Patent: Oct. 21, 2014

(54) SYSTEMS AND METHODS FOR SOCIAL NETWORKING INFLUENCED MAP GENERATION

(75) Inventors: Gregory A. Dunko, Cary, NC (US); Shruthi Soora, Raleigh, NC (US); Gary Randall Cole, Cary, NC (US)

(73) Assignee: HTC Corporation, Taoyuan, Taoyuan County (TW)

( * ) Notice: Subject to any disclaimer, the term of this patent is extended or adjusted under 35 U.S.C. 154(b) by 269 days.

(21) Appl. No.: 13/443,221

(22) Filed: Apr. 10, 2012

(65) Prior Publication Data

US 2013/0265312 A1  Oct. 10, 2013

(51) Int. Cl.
*G06T 11/20* (2006.01)
(52) U.S. Cl.
USPC .......................................... 345/442; 345/441
(58) Field of Classification Search
CPC ................. G06F 17/00; G06T 1/00–1/0092; G06T 11/20–11/206; G06T 15/00–15/005; G09G 5/00–5/008
USPC ............... 345/418, 419, 8, 441, 442
See application file for complete search history.

(56) References Cited

U.S. PATENT DOCUMENTS

| 6,798,378 | B1 | 9/2004 | Walters |
| 8,156,162 | B2 | 4/2012 | Lee et al. |
| 2009/0186628 | A1 | 7/2009 | Yonker et al. |
| 2011/0264370 | A1* | 10/2011 | Jakobson et al. ............. 701/209 |
| 2011/0288762 | A1* | 11/2011 | Kuznetsov .................... 701/200 |

FOREIGN PATENT DOCUMENTS

| EP | 1983302 A1 | 10/2008 |
| EP | 1840510 B1 | 2/2011 |
| TW | 200521896 A | 7/2005 |
| TW | 200937361 A | 9/2009 |
| TW | 201015959 A | 4/2010 |

OTHER PUBLICATIONS

German OA dated Jan. 21, 2014.
Taiwan OA dated Sep. 1, 2014.
English translation of abstract of TW 201015959 A (published Apr. 16, 2010).

* cited by examiner

*Primary Examiner* — Jacinta M Crawford
(74) *Attorney, Agent, or Firm* — McClure, Qualey & Rodack, LLP

(57) ABSTRACT

Various embodiments for social networking influenced map generation are disclosed. One embodiment is a method for generating a map that comprises retrieving, by a computing device, location data from a mobile computing device. The method further comprises determining, by the computing device, at least one attribute corresponding to the mobile computing device according to the retrieved location data and retrieving, by the computing device, information relating to a messaging event occurring on the mobile computing device. The method further comprises generating, by the computing device, a map displaying a path of traversal of the mobile computing device based on the retrieved location data, the map further comprising at least one graphical representation relating to the messaging event, the at least one graphical representation being displayed on the path of traversal.

20 Claims, 7 Drawing Sheets

SYSTEMS AND METHODS FOR SOCIAL NETWORKING INFLUENCED MAP GENERATION

BACKGROUND

With the rapid development in communications technology, mobile devices have become an integral part of many people's lives given the portability and the growing number of applications available on mobile devices. Today, individuals can perform a wide range of functions via mobile devices whereby communities of friends can stay connected. However, there is an ever-increasing desire to provide other means of social networking.

SUMMARY

Briefly described, one embodiment, among others, is a method for generating a map that comprises retrieving, by a computing device, location data from a mobile computing device. The method further comprises determining, by the computing device, at least one attribute corresponding to the mobile computing device according to the retrieved location data and retrieving, by the computing device, information relating to a messaging event occurring on the mobile computing device. The method further comprises generating, by the computing device, a map displaying a path of traversal of the mobile computing device based on the retrieved location data, the map further comprising at least one graphical representation relating to the messaging event, the at least one graphical representation being displayed on the path of traversal.

Another embodiment is a system for generating a map. The system comprises at least one computing device and a map generation application executable in the at least one computing device. The map generation application comprises logic configured to retrieve location data from a mobile computing device, logic configured to determine a rate of traversal of a user of the mobile computing device according to the retrieved location data, logic configured to retrieve information relating to time in which at least one messaging event occurs on the mobile computing device, and logic configured to generate a map displaying a path of traversal of the mobile computing device, the map further comprising at least one graphical representation relating to the at least one messaging event.

Another embodiment is a method for generating a map, comprising retrieving, by a computing device, location data from a mobile computing device and retrieving, by the computing device, information relating to at least one messaging event occurring on the mobile computing device. The method further comprises retrieving, by the computing device, information relating to at least one response to the at least one messaging event occurring on the mobile computing device and generating, by the computing device, a map displaying a path of traversal of the mobile computing device based on the retrieved location data, the map further comprising at least one graphical representation relating to the at least one messaging event, the map further comprising at least one graphical representation relating to the at least one response.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
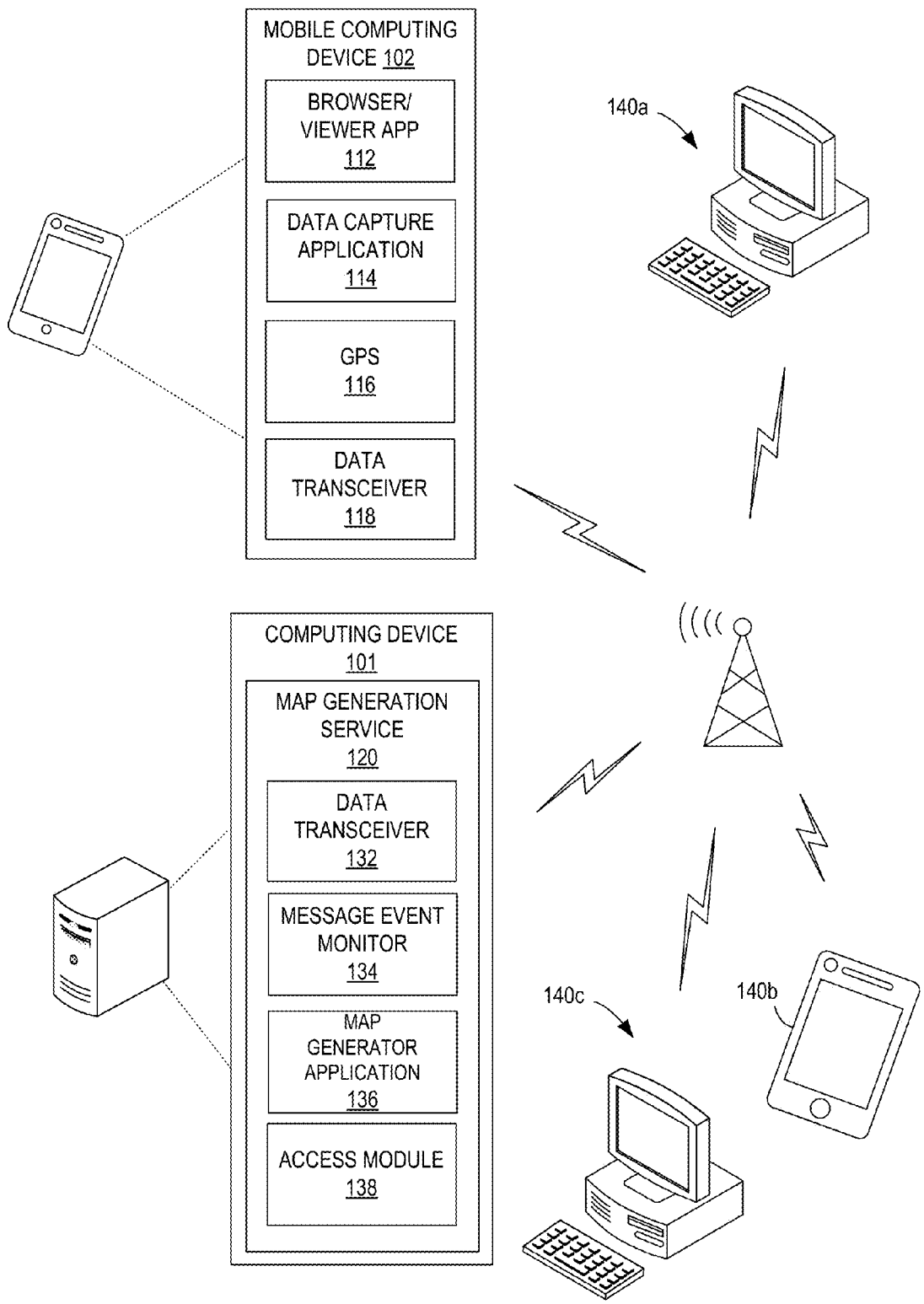
FIG. 1 is a block diagram of an environment in which embodiments of social networking influenced map generation may be implemented.

Having summarized various aspects of the present disclosure, reference will now be made in detail to the description of the disclosure as illustrated in the drawings. While the disclosure will be described in connection with these drawings, there is no intent to limit it to the embodiment or embodiments disclosed herein. On the contrary, the intent is to cover all alternatives, modifications and equivalents included within the spirit and scope of the disclosure as defined by the appended claims.

Today, it is common for mobile computing devices to come equipped with location determination and location reporting capabilities. Services such as Google Latitude® enable users to share location with friends or elected services. Such web services thus have an accurate "fix" of a user's given location and/or movement. In addition, these mobile computing devices come equipped with radio connection means for communicating from anywhere. In this regard, mobile computing devices enable a user to be "always connected." With this capability, a user may stay in touch with friends and family through various social networking service providers (e.g., Facebook®, Twitter®, MySpace®) or other means such as via instant messaging (IM) or text messaging. Thus, it is possible for a person to receive social network updates on their mobile computing device at any time in any location (e.g., while exercising).

Various embodiments are disclosed for generating maps whereby the capability to receive messaging events (short message service (SMS) messages, social networking updates, etc.) of a connected mobile computing device are leveraged. As described in detail below, such maps allow a community of friends, family, etc. to track the activities of an individual and observe the influence of received messages (e.g., Tweets®, Facebook® posts) on that individual. In the following discussion, a general description of the system and its components is provided, followed by a discussion of the operation of the same.

FIG. 1 is a block diagram of a map generation service 120 implemented in a computing device 101 in which embodiments for generating maps may be implemented. The computing device 101 in which the map generation service 120 is implemented may be embodied, for example, as a server computer or any other system providing computing capability. Note that in accordance with some embodiments, the computing device 101 may be integrated in the mobile computing device 102, and the mobile computing device 102 may comprise the components and functionality described herein related to the computing device 101. Alternatively, the computing device 101 may be implemented as a plurality of computing devices that are arranged, for example, in one or more server banks or computer banks or other arrangements.

For example, the computing device 101 may be implemented utilizing a cloud computing resource, a grid computing resource, and/or any other distributed computing arrangement. Such implementations of the computing device 101 may be located in a single installation or may be distributed among many different geographical locations. Even though the computing device 101 is referred to in the singular, it is understood that a plurality of computing devices may be employed in the various arrangements as described above.

Applications, logic, and/or other functionality may be executed in the computing device 101 according to various embodiments. The components executed on the computing device 101 include, for example, a map generation service 120 configured to perform social networking influenced map generation. As shown, the map generation service 120 may further comprise a data transceiver 132, a message event monitor 134, a map generator application 136, an access module 138, and other applications, services, processes, systems, engines, or functionality not discussed in detail herein. For some embodiments, the map generator application 136 may be implemented in the mobile computing device 102 where the map information is stored in a storage device within the mobile computing device 102.

The data transceiver 132 in the map generation service 120 is executed to facilitate communication with other computing devices 140a, 140b, 140c, such as, but not limited to desktop computers and mobile computing devices. The data transceiver 132 may be compatible with various means of wireless communications, including, for example, cellular communications and Wi-Fi communications and may retrieve such information as location data and corresponding time stamps from a mobile computing device 102, where the location data may be derived by a global positioning system (GPS) device 116 integrated in the mobile computing device 102. The location data may also be assisted by cellular networks, WiFi or sensors embedded in the device such as an accelerometer, compass, etc. or any other location monitoring system. The computing device 101 may also be connected via standard Internet protocol (IP) or other Internet connection to a wireless communication service.

The message event monitor 134 is executed to facilitate the monitoring of message events that occur on the mobile computing device 102. Message events may comprise such events as SMS messages, postings on social networking sites, e-mails, voicemails, phone calls, news updates, Really Simple Syndication (RSS) feeds, and so on, that are received by the mobile computing device 102. Alternatively, message events may be defined according to when a user of the mobile computing device 102 actually reads a message received by the mobile computing device 102.

In operation, the message event monitor 134 may periodically poll the mobile computing device 102 to determine whether any message events have occurred at the mobile computing device 102. Alternatively, the message event monitor 134 may periodically receive alerts sent by the mobile computing device 102 indicating that one or more message events have occurred. The message event monitor 134 may also monitor user device channels (e.g., Facebook®, Twitter® feeds, etc.) directly.

The map generator application 136 is executed to generate maps that depict the path of traversal of the user of the mobile computing device 102. The maps may further comprise graphical representations corresponding to message events occurring at the mobile computing device 102, where such graphical representations may convey such information as time of receipt of a message, the sender of the message, the corresponding service provider (e.g., social networking service provider), the rate of traversal of the user, and other information, as described in more detail below.

The access module 138 in the map generation service 120 is executed to facilitate controlled access by third parties to the maps generated by the map generation service 120, where third parties access the maps via such devices as the computing devices 140a, 140b, 140c depicted in FIG. 1. In accordance with some embodiments, the user of the mobile computing device 102 controls which individuals (e.g., family members, friends, associates) are allowed to track the path of traversal of the user of the mobile computing device 102. In this regard, the access module 138 is executed to provide restricted access to the generated maps. Note that the generated map and related information may be saved in a storage device within the mobile computing device 102, and the individual 202 may later access the generated map on the mobile computing device 102 (for example, later on after the individual finishes jogging).

The mobile computing device 102 shown in FIG. 1 may be embodied as a tablet, a smartphone, a car PC, a navigation device, a portable game device, a portable multimedia player, or other portable computing device. The browser/viewer application 112 in the mobile computing device 102 may be executed to access and render network pages, such as web pages, or other network content comprising, for example, postings on social networking sites, blogs, etc. The browser/viewer application 112 may also be executed to view such electronic communications as SMS messages, IM messages, e-mails, and so on.

The mobile computing device 102 also includes a data capture application 114 executed to facilitate the logging of such information as location data derived via an onboard GPS device 116 with assistance from cellular, other networks, or location monitoring systems and the occurrence of message events where message events may be defined, for example, as a time of receipt of a message by the mobile computing device 102 or the instance in which the user of the mobile computing device 102 actually reads a message. The data transceiver 118 in the mobile computing device 102 is executed to facilitate communications between the mobile computing device 102 and other computing devices 101, 140a, 140b, 140c or a mobile or wired network. Note that while the embodiments disclosed herein relating to the map generation service 120 are described in the context of a computing device such as a server, the map generation service 120 may also be implemented in other computing devices, including the mobile computing device 102 used by the individual being tracked.

Figure 2:
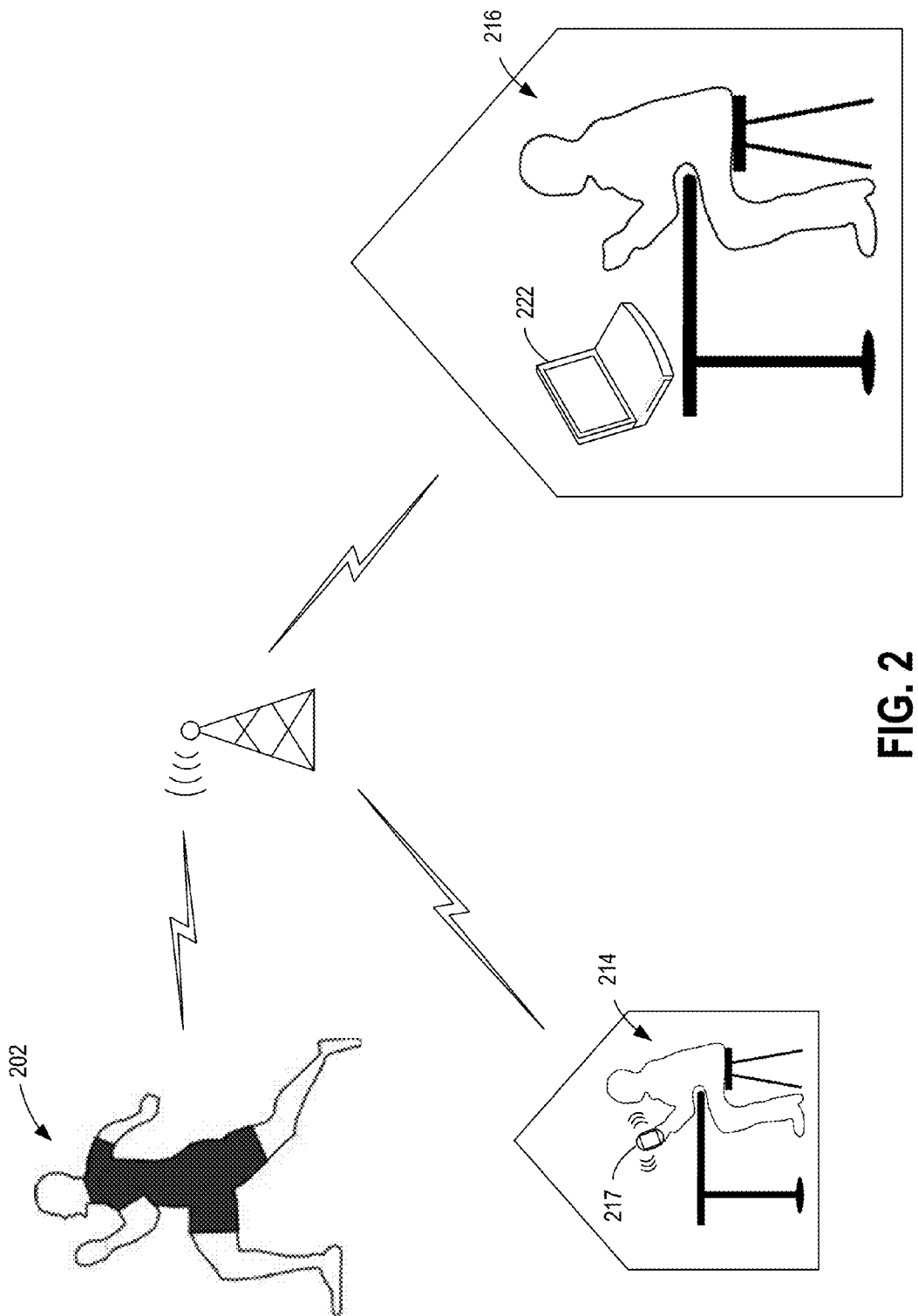
FIG. 2 illustrates an example application of the map generation service executed in the computing device in FIG. 1.

Reference is made to FIG. 2, which illustrates an example application of the map generation service 120 depicted in FIG. 1. In operation, the map generation service 120 allows family members, friends, acquaintances, etc. to monitor and "stay connected" with an individual 202 while the individual 202 takes part in an activity (e.g., walking, jogging, or driving around the city). In the illustration shown in FIG. 2, a first individual 202 is shown jogging, where the individual 202 is wearing or carrying the mobile computing device 102 described in connection with FIG. 1. The mobile computing device 102 transmits the current location of the individual 202 via the GPS device 116 (FIG. 1). The individual may also receive messages (e.g., SMS texts, social networking postings, e-mails) via the mobile computing device 102. Similarly, the individual 202 may generate and transmit messages using the mobile computing device 102.

In the illustration shown, individuals 214, 216 at remote locations monitor the activities of the individual 202 by viewing map(s) shown on local displays of computing devices 217, 222 utilized by the individuals 214, 216. For example, respective browser applications executing on the computing devices 217, 222 may access a map incorporated in a network page served up by the map generation service 120, thereby rendering a network page on the displays of the computing devices 217, 222. Note that the individual 202 being monitored may also view the map on the mobile computing device 102 (FIG. 1).

The network page shown on the displays of the computing devices 217, 222 may comprise, for example, maps generated by the map generation service 120 relating to activities of the individual 202. In accordance with some embodiments, the individuals 214, 216 monitoring the activities of the first individual 202 are individuals who have been granted access by the access module 138 (FIG. 1) in the map generation service 120 and are included in a listing of individuals authorized to view the map.

The individuals 214, 216 at the remote locations may also transmit messages to the individual 202 being monitored. For example, individuals 214, 216 may transmit SMS messages, IM messages, or post comments/messages on a social networking site for the individual 202 to view. As described in more detail below, these message events may be graphically depicted in the map generated by the map generation service 120.

Figure 3:
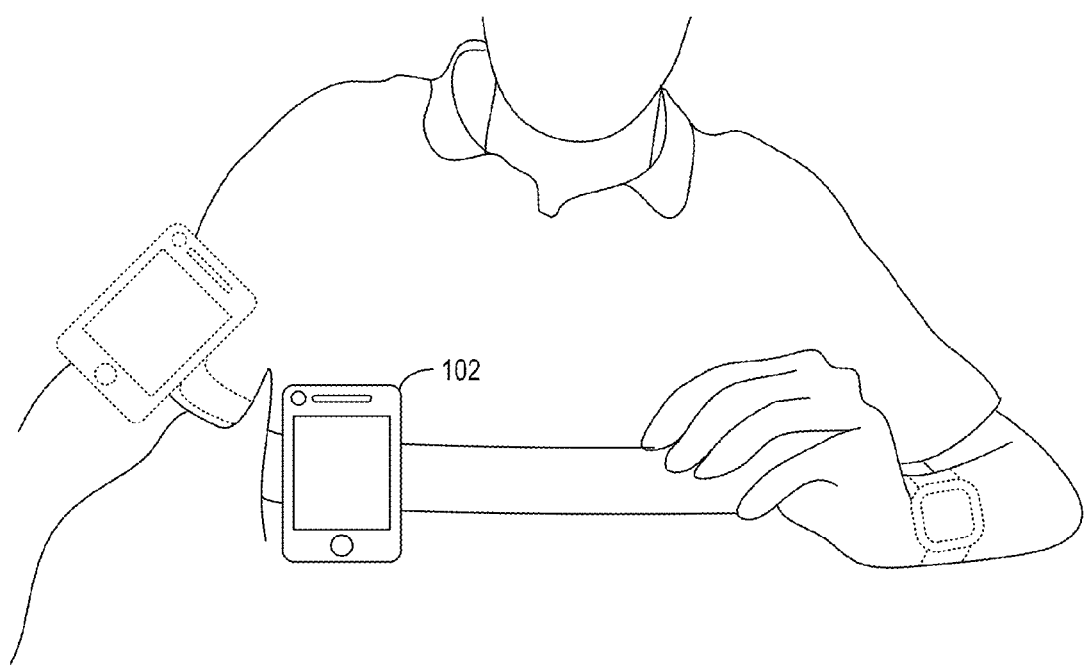
FIG. 3 illustrates the use of a mobile computing device by an individual for providing data to the map generation service of FIG. 1 according to various embodiments of the present disclosure.

FIG. 3 depicts placement of the mobile computing device 102 in FIG. 1 on an individual being monitored. As shown, the mobile computing device 102 is worn or carried by an individual 202 (FIG. 2) being tracked in a manner such that the mobile computing device 102 doesn't hinder the individual's activities. By way of example, the mobile computing device 102 may be attached to a harness worn around the chest area of the individual 202. Alternatively, the mobile computing device 102 can be worn around the individual's 202 arm, where the mobile computing device 102 may be detachably attached to a strap or harness (e.g., via a Velcro® attachment means) to facilitate quick access to the mobile computing device 102 for purposes of reading messages. For some embodiments, the mobile computing device 102 may even be worn around the individual's 202 wrist, placed on the dashboard of a car, placed in a phone dock/mount in the car, etc. where the individual 202 is traveling by car.

Figure 4:
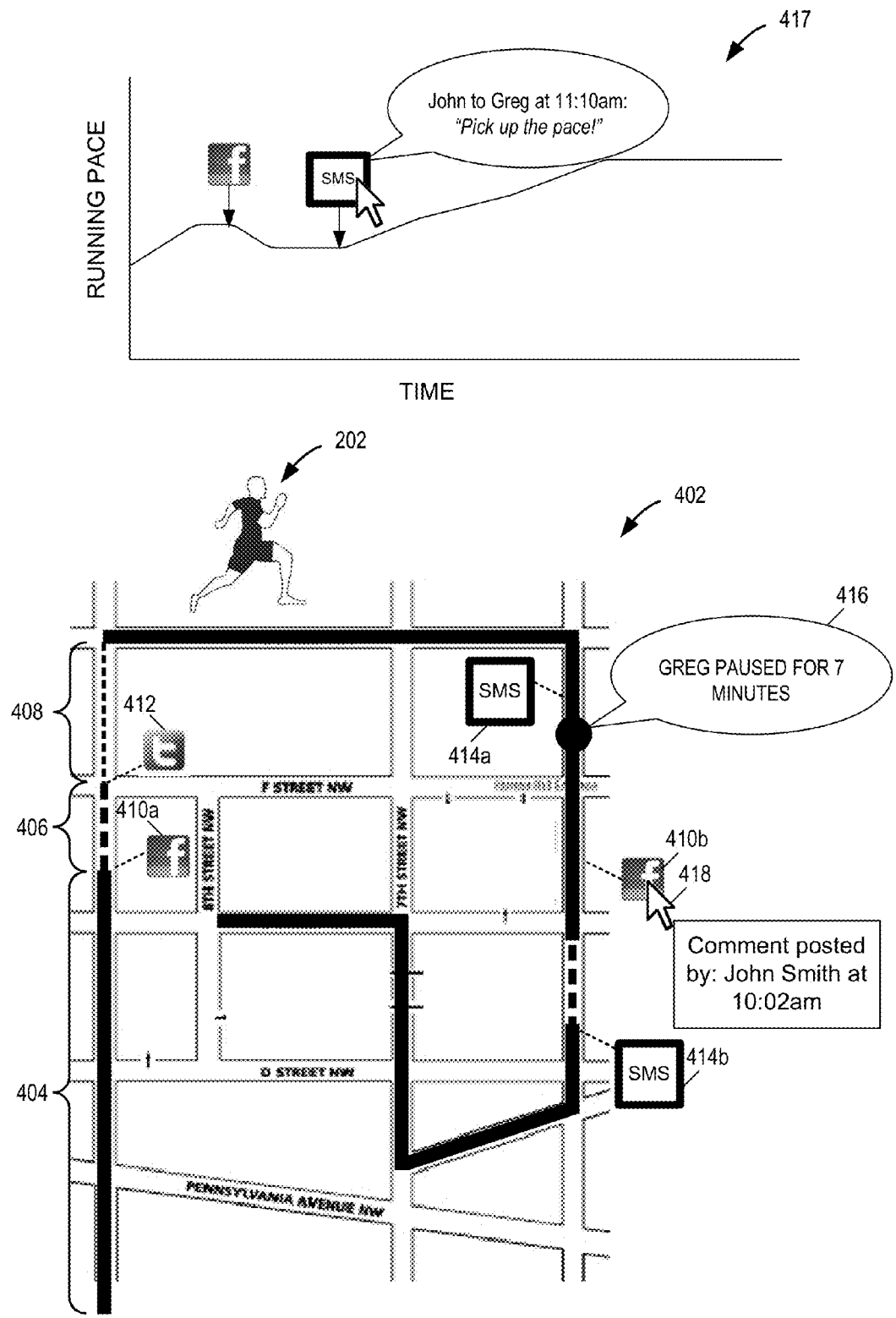
FIG. 4 depicts an illustration of a map generated by the map generation service in FIG. 1 that allows remote users to track the activities of an individual according to various embodiments of the present disclosure.

FIG. 4 depicts an example of a map 402 generated by the map generation service 120 (FIG. 1). The example map 402 includes a path of traversal of an individual 202 jogging where the map 402 is updated in real-time. In accordance with some embodiments, the traversal rate of the individual 202 may be shown on the map 402. In the example shown, the solid, thick line represents an overall average traversal rate of the individual 202, while the dotted lines represent a change in traversal rate. For some embodiments, the dotted lines are included in the map 402 if the change in traversal rate exceeds a predetermined threshold, where the width of the dotted lines corresponds to the traversal rate. For example, shown on the left side of the map 402 are graphical representations corresponding to three traversal rates 404, 406, 408.

In accordance with some embodiments, the graphical representation corresponding to the first traversal rate 404 represents an overall average traversal rate of the individual 202. The second graphical representation corresponding to the next traversal rate 406 represents a decreased traversal rate where the decreased traversal rate 406 is less than the overall average traversal rate 404 by a predetermined threshold amount. Similarly, the third graphical representation corresponding to the third traversal rate represents a decreased traversal rate where the decreased traversal rate 408 is also less than the overall average traversal rate 408 by a predetermined threshold amount. In this example, the third traversal rate 408 is also less than the second traversal rate 406. Note that line widths associated with the second and third traversal rates 406, 408, respectively vary as the widths are proportional to the corresponding traversal rates.

The map 402 further comprises graphical representations corresponding to messaging events occurring at the mobile computing device 102 (FIG. 1) being used by the individual 202. For some embodiments, a unique graphical representation is incorporated for each message type. In the non-limiting example shown, a first graphical representation type 410a, 410b is used for Facebook® posts, while a second graphical representation 412 is used for Tweets® posted on Twitter®. In the illustration shown in FIG. 4, another graphical representation 414a, 414b is used to represent text messages received by the individual 202.

In the map 402 shown, the placement of each of the graphical representations 410a, 410b, 412, 414a, 414b along the traversal path of the individual 202 corresponds to the time in which the corresponding message event occurred at the mobile computing device 102 carried by the individual 202. For some embodiments, a message event may correspond to the time in which the mobile computing device 102 receives the message. Alternatively, a message event may correspond to the time in which the individual 202 actually reads the message. For example, a message event may correspond to the time in which the individual 202 accesses his Facebook® account to read messages/comments posted by his/her friends. In some instances, it may be beneficial to show both the time of receipt and the time the message is read.

For some implementations, individuals viewing the map 402 may view the time and sender of the message by hovering a pointer 418 (e.g., a mouse pointer or a touch signal) over one of the graphical representations 410b. For some implementations, the individual 202 being monitored may receive notifications when remote users hover over one of the graphical representations 410a, 410b, 412, 414a, 414b. The individual 202 being monitored may also receive a listing of individuals who are currently monitoring the individual's 202 activities. The map 402 may further comprise other items such as status identifiers to update viewers on the activities of the individual 202 being monitored. For example, the map 402 shows a message 416 indicating to viewers that the individual 202 (i.e., "Greg") stopped jogging for seven minutes. The map may further comprise supplemental information such as the chart 417 shown above the map 402 that depicts the running pace of the individual 202 over time relative to various message events that occur on the mobile computing device 102.

Figure 5:
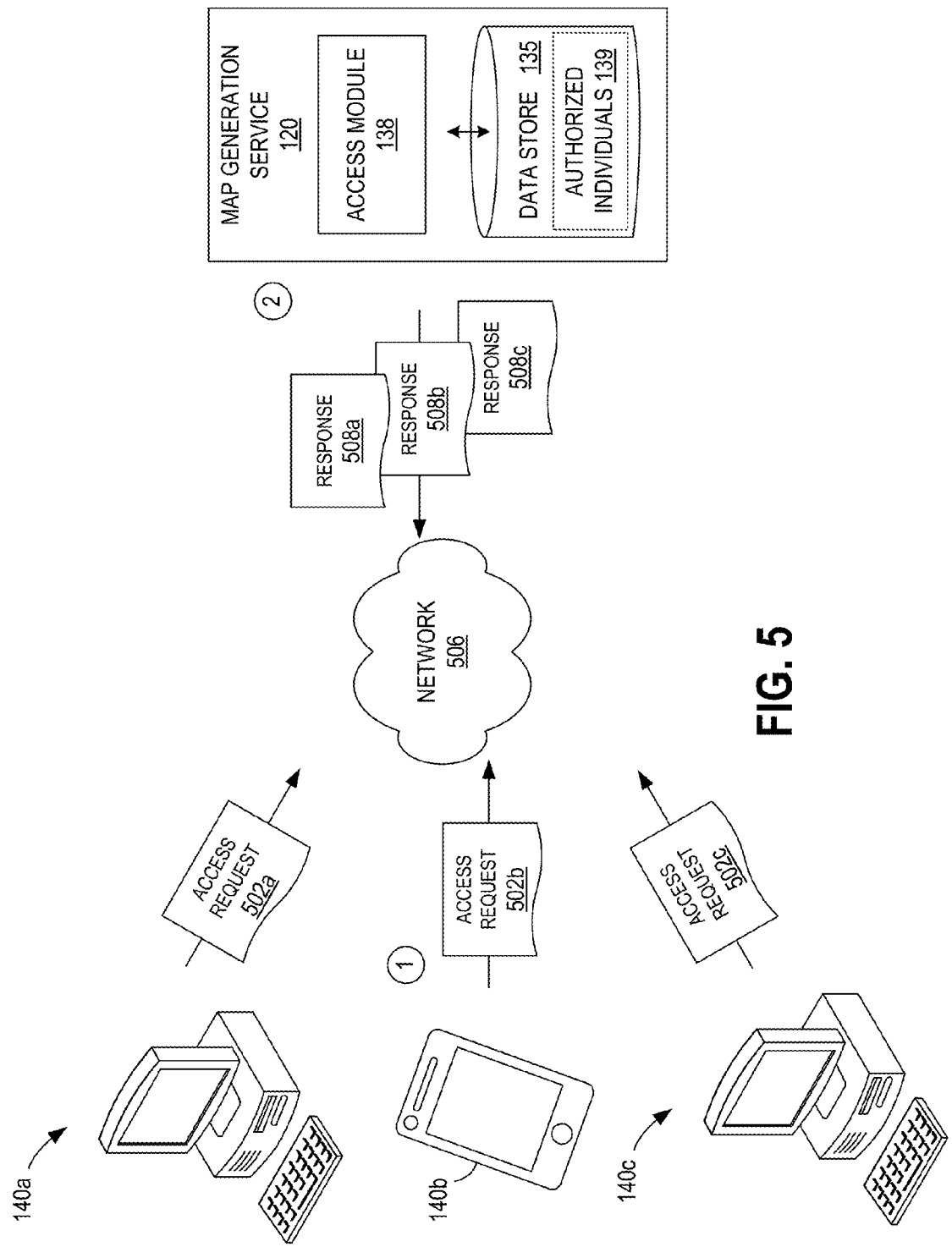
FIG. 5 is a signal flow diagram illustrating restricted access executed by the map generation service in FIG. 1 according to various embodiments of the present disclosure.

Reference is made to FIG. 5, which depicts how the individual 202 (FIG. 4) being tracked can control data access by users of remote computing devices 140a, 140b, 140c to maps 402 (FIG. 4) generated by the map generation service 120. In accordance with various embodiments, access to maps 402 created by the map generation service 120 is controlled by the access module 138. For some scenarios, the individual 202 being tracked can specify that maps corresponding to that individual's activities can be viewed by anyone. In other scenarios, however, the individual 202 may wish to limit access to the maps 402 to certain users namely, friends, colleagues, etc., thereby creating a network or community of users that follow the individual's activities.

For some embodiments, the individual 202 may activate certain filters to specific users. For example, a student may want to allow a parent to track him but not to allow the parent to see messages from his girlfriend. Also, the individual 202 may define "groups" with common access rights. For example, a running group of five friends may be granted access to view the individual's path of traversal but not to other information, such as text messages received by the individual 202. In this regard, access levels and permissions may be controlled by the individual 202.

As shown in FIG. 5, users of remote computing devices 140a, 140b, 140c wishing to access maps 402 transmit an access request 502a, 502b, 502c via a network 506 to the access module 138. In accordance with various embodiments, the map generation service 120 may include a data store 135, where various data is stored in a data store 135 that is accessible to the access module 138. The data store 135 may comprise, for example, a database or other data storage structure. For some embodiments, the map information may be stored in a storage device of the mobile computing device 102.

The access module 138 accesses the data store 135, which may store a listing 139 of individuals authorized by the individual 202 being tracked to view map(s) corresponding to the individual's activities. Based on whether the users of the remote computing devices 140a, 140b, 140c are found in the listing 139 of authorized individuals, the access module 138 transmits a corresponding response 508a, 508b, 508c over the network 506 to each remote computing device 140a, 140b, 140c indicating whether the corresponding access request 502a, 502b, 502c has been granted. Based on whether access is granted, each remote computing device 140a, 140b, 140c is then able to locally display map(s) generated by the map generation service 120 relating to the activities of the individual 202 being tracked.

Figure 6:
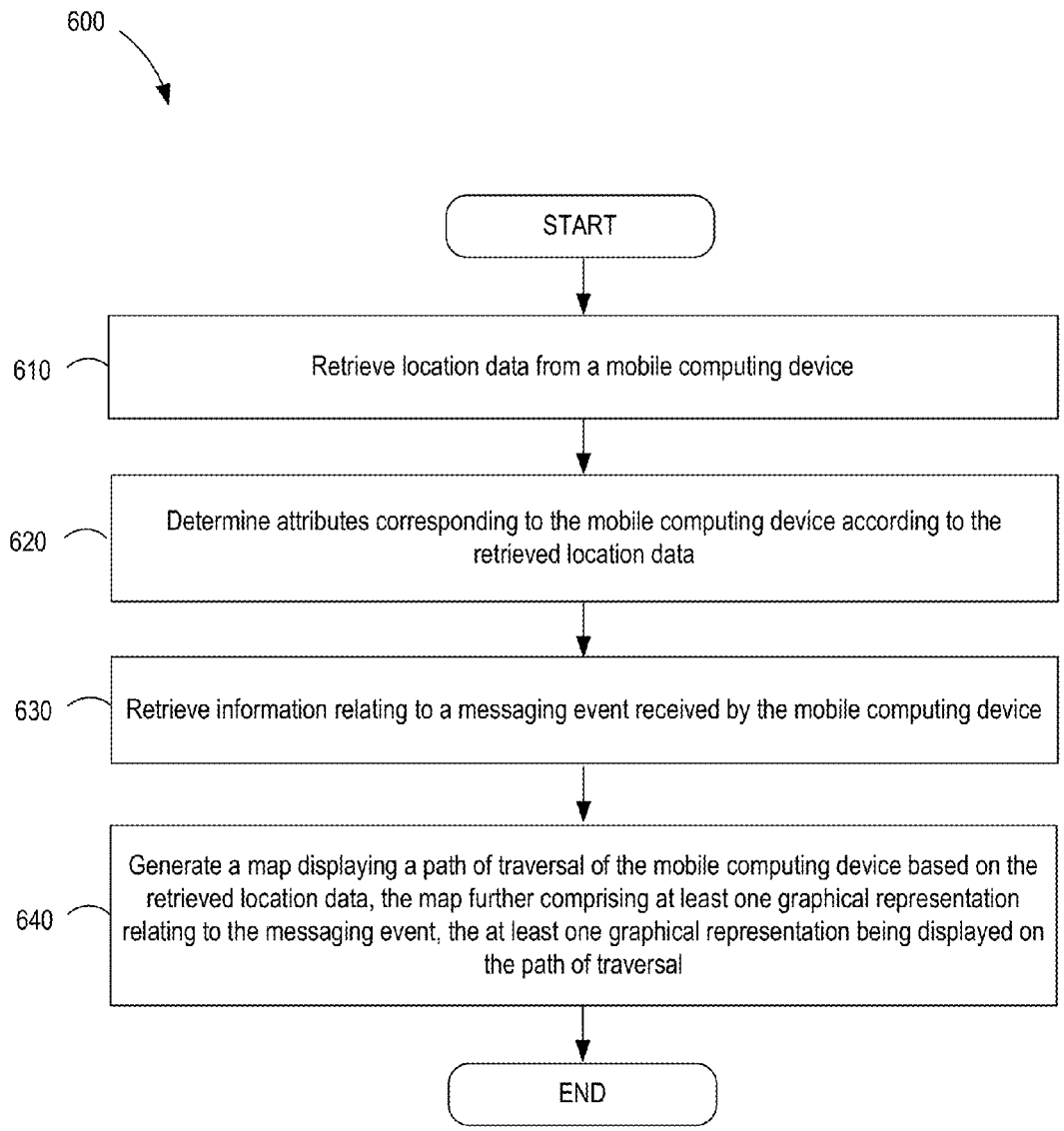
FIG. 6 is a top-level flowchart illustrating examples of functionality implemented as portions of the system of FIG. 1 for social networked influenced map generation according to various embodiments of the present disclosure.

Reference is made to FIG. 6, which is a flowchart 600 in accordance with one embodiment for social networking influenced map generation performed by the map generation service 120 (FIG. 1) executed in the computing device 101 (FIG. 1). It is understood that the flowchart 600 of FIG. 6 provides merely an example of the many different types of functional arrangements that may be employed. As an alternative, the flowchart of FIG. 6 may be viewed as depicting an example of steps of a method implemented via execution of the map generation service 120 in the computing device 101 according to one or more embodiments.

In accordance with one embodiment for social networking influenced map generation, the map generation service 120 executing in the computing device 101 begins with block 610 and retrieves location data and corresponding time stamps from a mobile computing device 102 (FIG. 1) of the individual 202 (FIG. 4) being tracked. In block 620, the map generation service 120 determines attributes corresponding to the mobile computing device 102 according to the retrieved location data and corresponding time stamps. One attribute may comprise, for example, the real-time walking/running pace of the individual 202. Another attribute may comprise the average pace that the individual 202 being tracked is walking/running. Details regarding the determination of the real-time and average pace extend beyond the scope of this disclosure.

In block 630, the map generation service 120 retrieves information relating to a messaging event occurring on the mobile computing device 102. The messaging event may comprise, for example, the receipt of an alert by the mobile computing device 102 that a Facebook® message/comment has been posted on the individual's 202 account. Alternatively, the messaging event may be defined according to when the individual 202 actually reads a message received on the mobile computing device 102. For example, a messaging event may be triggered when the individual 202 reads a Facebook® posting on the individual's 202 account.

In block 640, the map generation service 120 in the computing device 101 generates a map 402 (FIG. 4) displaying a path of traversal of the mobile computing device 102 based on the retrieved location data. As described earlier in connection with FIG. 4, the map 402 may further comprise one or more graphical representations relating to the messaging event, where the one or more graphical representations are displayed on the path of traversal.

Figure 7:
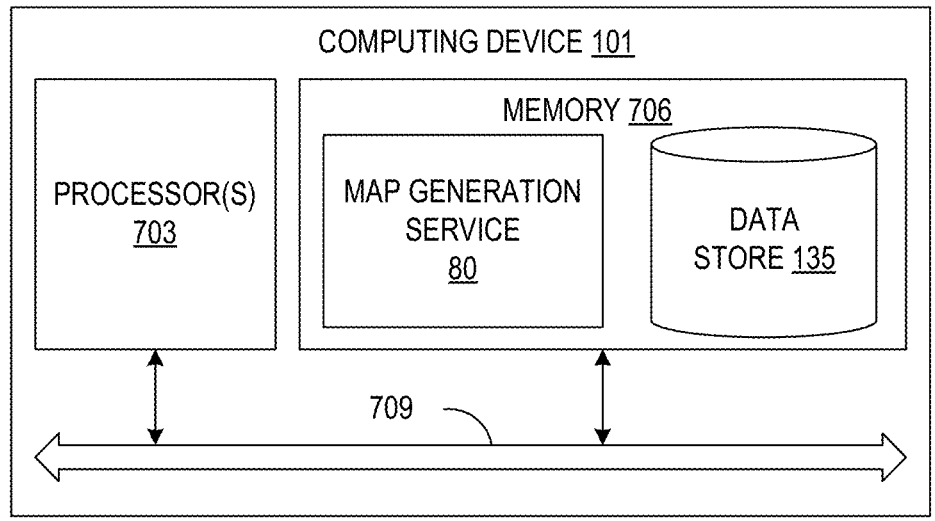
FIG. 7 is a schematic block diagram of the computing device in FIG. 1 according to an embodiment of the present disclosure.

With reference to FIG. 7, shown is a schematic block diagram of the computing device 101 in which the map generation service 120 is implemented according to an embodiment of the present disclosure. The computing device 101 includes at least one processor circuit, for example, having a processor 703 and a memory 706, both of which are coupled to a local interface 709. The local interface 709 may comprise, for example, a data bus with an accompanying address/control bus or other bus structure as can be appreciated.

Stored in the memory 706 are both data and several components that are executable by the processor 703. In particular, stored in the memory 706 and executable by the processor 703 are the map generation service 120 and potentially other applications. The data store 135 may be implemented as part of the memory 706. In addition, an operating system may be stored in the memory 706 and executable by the processor 703.

Figure 8:
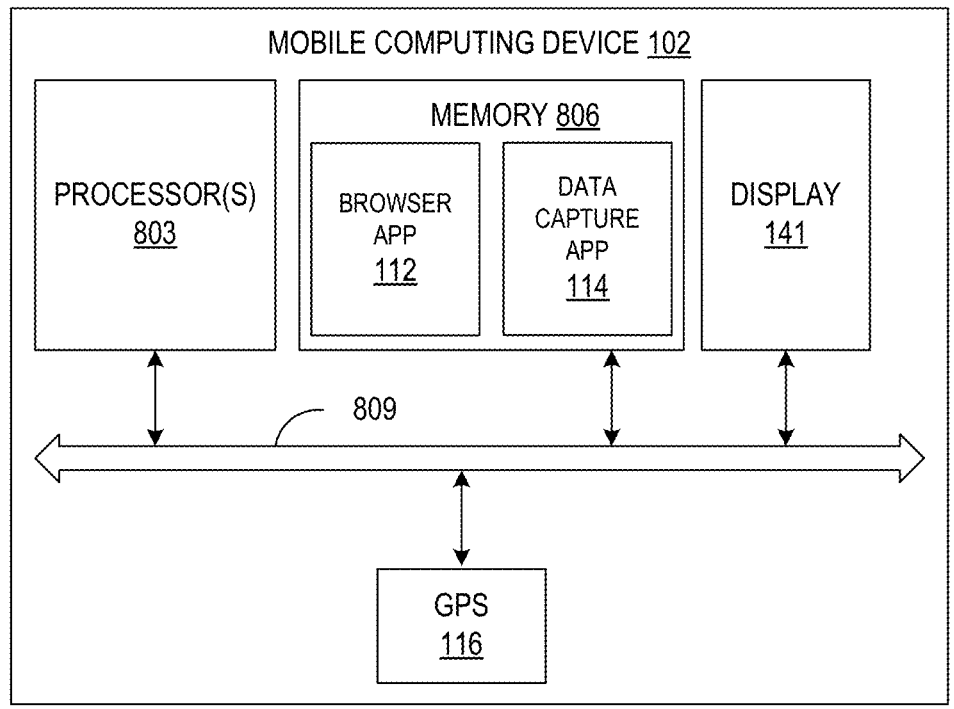
FIG. 8 is a schematic block diagram of the mobile computing device in FIG. 1 according to an embodiment of the present disclosure.

With reference to FIG. 8, shown is a schematic block diagram of the mobile computing device 102 according to an embodiment of the present disclosure. The mobile computing device 102 includes at least one processor circuit, for example, having a processor 803 and a memory 806, both of which are coupled to a local interface 809. The mobile computing device 102 also includes a display 141 such as a touchscreen display. The local interface 809 may comprise, for example, a data bus with an accompanying address/control bus or other bus structure as can be appreciated.

Stored in the memory 806 are both data and several components that are executable by the processor 803. In particular, stored in the memory 806 and executable by the processor 803 are the browser application 112, the data capture application 114, and potentially other applications. In addition, an operating system may be stored in the memory 806 and executable by the processor 803.

It is understood that there may be other applications that are stored in each of the memories 706/806 and are executable by the respective processors 703/803 as can be appreciated. Where any component discussed herein is implemented in the form of software, any one of a number of programming languages may be employed.

A number of software components are stored in the respective memories 706/806 and are executable by the processors 703/803. In this respect, the term executable means a program file that is in a form that can ultimately be run by a respective processor 703/803. Examples of executable programs may be, for example, a compiled program that can be translated into machine code in a format that can be loaded into a random access portion of a memory 706/806 and run by a processor 703/803, source code that may be expressed in proper format such as object code that is capable of being loaded into a random access portion of a memory 706/806 and executed by a processor 703/803, or source code that may be interpreted by another executable program to generate instructions in a random access portion of one of the memories 706/806 to be executed by a respective processor 703/803, etc.

An executable program may be stored in any portion or component of a respective memory 706/806 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Each of the memories 706/806 is defined herein as including both volatile and nonvolatile memory and data storage components. Volatile components are those that do not retain data values upon loss of power. Nonvolatile components are those that retain data upon a loss of power. Thus, each memory 706/806 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components.

In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, each processor 703/803 may represent multiple processors and each memory 706/806 may represent multiple memories that operate in parallel processing circuits, respectively. In such a case, each local interface 709/809 may be an appropriate network that facilitates communication between any two of the multiple processors, between any processor and any of the multiple memories, or between any two memories, etc. Such a local interface 709/809 may comprise additional systems designed to coordinate this communication, including, for example, performing load balancing. Each processor 703/803 may be of electrical or of some other available construction.

Although the components and applications described herein may be embodied in software or code executed by general purpose hardware as discussed above, as an alternative the same may also be embodied in dedicated hardware or a combination of software/general purpose hardware and dedicated hardware.

If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 6 shows an example of functionality associated with implementation of the various components in the system of FIG. 1. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flowchart of FIG. 6 shows a specific order of execution, it is understood that the order of execution may differ from that which is depicted. For example, the order of execution of two or more blocks may be scrambled relative to the order shown. Also, two or more blocks shown in succession in FIG. 6 may be executed concurrently or with partial concurrence. Further, in some embodiments, one or more of the blocks shown in FIG. 6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that comprises software or code can be embodied in any non-transitory computer-readable medium for use by or in connection with an instruction execution system such as, for example, a processor in a computer system or other system. Each may comprise, for example, statements including instructions and declarations that can be fetched from the computer-readable medium and executed by the instruction execution system.

In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs.

Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

At least the following is claimed:

1. A method for generating a map, comprising:
   retrieving, by a computing device, location data and corresponding time stamps from a mobile computing device;
   determining, by the computing device, at least one attribute corresponding to the mobile computing device according to the retrieved location data and corresponding time stamps;
   retrieving, by the computing device, information relating to a messaging event occurring on the mobile computing device; and
   generating, by the computing device, a map displaying a path of traversal of the mobile computing device based on the retrieved location data, the map further comprising at least one graphical representation relating to the at least one attribute, the map further comprising at least one graphical representation relating to the messaging event, the at least one graphical representation relating to the messaging event being displayed on the path of traversal.

2. The method of claim 1, wherein the messaging event comprises at least one of:
   a SMS (Short Message Service) message;
   a social networking posting relating to a user of the mobile computing device;
   a voicemail;
   a phone call;
   a news update;
   an instant messaging (IM) communication; and
   a Really Simple Syndication (RSS) feed.

3. The method of claim 2, wherein the at least graphical representation relating to the messaging event is rendered on the map according to a time in which the message was received by the mobile computing device.

4. The method of claim 2, wherein the at least graphical representation relating to the messaging event is rendered on the map according to a time in which the message was read by the user of the mobile computing device.

5. The method of claim 2, wherein a unique graphical representation is assigned to each type of messaging event.

6. The method of claim 5, wherein a unique graphical representation is assigned according to each social networking service provider and user.

7. The method of claim 1, further comprising restricting, by the computing device, access to the generated map according to a listing of authorized individuals specified by the user of the mobile computing device.

8. The method of claim 1, wherein the at least one attribute comprises a rate of traversal of the user and an average rate of traversal.

9. The method of claim 8, wherein the map further represents the rate of traversal of the user according to a line superimposed on the path of traversal, wherein one or more of a line width and a line type associated with the line varies according to the traversal rate.

10. A system for generating a map, comprising:
    at least one computing device; and
    a map generation application executable in the at least one computing device, the map generation application comprising:
    logic configured to retrieve location data from a mobile computing device;
    logic configured to determine a rate of traversal of the mobile computing device according to the retrieved location data;
    logic configured to retrieve information relating to time in which at least one messaging event occurs on the mobile computing device; and
    logic configured to generate a map displaying a path of traversal of the mobile computing device, the map further comprising at least one graphical representation relating to the at least one messaging event.

11. The system of claim 10, wherein the at least one graphical representation relating to the at least one messaging event comprises at least one graphical representation relating to when the at least one messaging event was received by the mobile computing device.

12. The system of claim 10, wherein the at least one graphical representation relating to the at least one messaging event comprises at least one graphical representation relating to when the at least one messaging event was accessed by a user using the mobile computing device.

13. The system of claim 10, wherein the messaging event comprises at least one of:
    a SMS (Short Message Service) message read by the user of the mobile computing device; and
    a posting on a social networking website read by the user of the mobile computing device;
    a voicemail;
    a phone call;
    a news update;
    an instant messaging (IM) communication; and
    a RSS (Really Simple Syndication) feed.

14. The system of claim 10, wherein the logic configured to generate a map is further configured to superimpose the at least one graphical representation on the path of traversal, wherein superimposition of the at least one graphical representation on the path of traversal is performed according to time of receipt of the at least one graphical representation.

15. The system of claim 10, wherein the map further comprises a graphical representation of a change in average rate of traversal.

16. The system of claim 15, wherein the map comprises a graphical representation if the rate of traversal deviates from an average traversal rate by a predetermined amount.

17. A method for generating a map, comprising:
    retrieving, by a computing device, location data from a mobile computing device;
    retrieving, by the computing device, information relating to at least one messaging event occurring on the mobile computing device;
    retrieving, by the computing device, information relating to at least one response to the at least one messaging event occurring on the mobile computing device; and
    generating, by the computing device, a map displaying a path of traversal of the mobile computing device based on the retrieved location data, the map further comprising at least one graphical representation relating to the at least one messaging event, the map further comprising at least one graphical representation relating to the at least one response.

18. The method of claim 17, wherein the at least one graphical representation relating to the at least one messaging event comprises at least one graphical representation relating to when the at least one messaging event was received by the mobile computing device, and wherein the at least one graphical representation relating to the at least one response, comprises at least one graphical representation relating to when the at least one response was transmitted by the mobile computing device.

19. The method of claim 17, further comprising transmitting the map to at least one individual granted access by a user of the mobile computing device to view the map.

20. The system of claim 17, wherein the map further comprises at least one graphical representation corresponding to a traversal rate of the user.

* * * * *